(12) United States Patent
Chen

(10) Patent No.: US 10,387,460 B2
(45) Date of Patent: Aug. 20, 2019

(54) METHOD AND APPARATUS FOR PROCESSING TEXT INFORMATION

(71) Applicant: Tencent Technology (Shenzhen) Company Limited, Shenzhen (CN)

(72) Inventor: Shengrong Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 426 days.

(21) Appl. No.: 15/176,364

(22) Filed: Jun. 8, 2016

(65) Prior Publication Data

US 2016/0321353 A1    Nov. 3, 2016

Related U.S. Application Data

(63) Continuation of application No. PCT/CN2015/070148, filed on Jan. 6, 2015.

(30) Foreign Application Priority Data

Jan. 6, 2014   (CN) .......................... 2014 1 0004140

(51) Int. Cl.
*G06F 16/31*     (2019.01)
*G06F 17/27*     (2006.01)
(Continued)

(52) U.S. Cl.
CPC .......... *G06F 16/328* (2019.01); *G06F 16/313* (2019.01); *G06F 17/211* (2013.01);
(Continued)

(58) Field of Classification Search
CPC ........... G06F 17/30867; G06F 21/6218; G06F 3/0482; G06F 17/30598; G06F 21/10; G06F 21/552; G06F 17/30699
See application file for complete search history.

(56) References Cited

U.S. PATENT DOCUMENTS

| | | | |
|---|---|---|---|
| 2005/0060643 A1* | 3/2005 | Glass | G06F 17/241 715/205 |
| 2005/0204005 A1 | 9/2005 | Purcell | |
| 2013/0136371 A1* | 5/2013 | Ikai | G06T 5/001 382/224 |

FOREIGN PATENT DOCUMENTS

| | | |
|---|---|---|
| CN | 101977360 A | 2/2011 |
| CN | 103037339 A | 4/2013 |

(Continued)

OTHER PUBLICATIONS

International Search Report for corresponding application PCT/CN2015/070148 filed on Jan. 6, 2015; dated Apr. 13, 2015.

*Primary Examiner* — Angelica Ruiz

(74) *Attorney, Agent, or Firm* — Brinks Gilson & Lione

(57) ABSTRACT

The present application relates to a A method for processing text information is provided, the method including: obtaining text information and extracting text characters contained in the text information; extracting, from the text characters, target characters satisfying a predetermined rule; calculating a filtering index of the text information according to the target characters; and when the filtering index meets a predetermined condition, executing an operation corresponding to the predetermined condition on the text information. In addition, an apparatus for processing text information is further provided. The method and apparatus for processing text information can improve the accuracy and efficiency of filtering out junk text information.

14 Claims, 8 Drawing Sheets

(51) Int. Cl.
*G06Q 10/10* (2012.01)
*G06F 17/21* (2006.01)
*G06F 17/22* (2006.01)

(52) U.S. Cl.
CPC ...... *G06F 17/2217* (2013.01); *G06F 17/2715* (2013.01); *G06Q 10/107* (2013.01)

(56) References Cited

FOREIGN PATENT DOCUMENTS

| | | |
|---|---|---|
| CN | 103324617 A | 9/2013 |
| CN | 103336761 A | 10/2013 |
| CN | 103336766 A | 10/2013 |
| JP | 2005208780 A | 8/2005 |

\* cited by examiner

METHOD AND APPARATUS FOR PROCESSING TEXT INFORMATION

PRIORITY CLAIM AND RELATED APPLICATIONS

This application is a continuation of International Patent Application Number PCT/CN2015/070148 filed on 6 Jan. 2015 which claims priority to Chinese Patent Application No. 201410004140.6, entitled "Method and apparatus for processing text information" filed on 6 Jan. 2014, both of which said applications are herein incorporated by reference in their entirety.

TECHNICAL FIELD

The present disclosure relates to computer communications technologies, and more particularly to a method and an apparatus for processing text information.

BACKGROUND

With the rapid development of computer and network communications technologies, people exchange text information through networks more and more frequently. However, text information can reach user terminals such as users' mobile phones easily, and therefore is often used as an advertising means, and is even used by some lawbreakers to send junk information such as fraud or pornographic information, which severely affects and disturbs users' normal life.

Existing junk text information filtering technologies mainly use keyword filtering and black and whitelist filtering methods to filter junk text information. However, in a keyword-based method for filtering junk text information, the keywords can hardly cover all illegal information, and a malicious user can avoid the keywords by, for example, adding a large number of characters or interfering characters such as punctuation marks to the content of text information, so as to prevent the text information from being filtered. Moreover, in a filtering method on the basis of a blacklist and whitelist, because text information is processed according to users, if text information comes from a user in the whitelist, the text information is not filtered out even if content of the text information contains junk information.

Therefore, the existing junk text information filtering technologies have low filtering accuracy and are inefficient.

SUMMARY

Accordingly, a method and an apparatus for processing text information are provided, which can improve the accuracy and efficiency of filtering out junk text information.

A method for processing text information includes: obtaining text information and extracting text characters contained in the text information; extracting, from the text characters, target characters satisfying a predetermined rule; calculating a filtering index of the text information according to the target characters; and when the filtering index meets a predetermined condition, executing an operation corresponding to the predetermined condition on the text information.

An apparatus for processing text information includes: a text character extraction module, configured to obtain text information and extract text characters contained in the text information; a target character extraction module, configured to extract, from the text characters extracted by the text character extraction module, target characters satisfying a predetermined rule; a calculation module, configured to calculate a filtering index of the text information according to the target characters extracted by the target character extraction module; and a processing module, configured to: when the filtering index calculated by the calculation module meets a predetermined condition, execute an operation corresponding to the predetermined condition on the text information.

In the method and apparatus for processing text information provided in embodiments of the present invention, text characters contained in text information are extracted, target characters satisfying a predetermined rule are extracted from the text characters, a filtering index of the text information is calculated according to the target characters, and when the filtering index meets a predetermined condition, an operation corresponding to the predetermined condition is executed on the text information. Because the filtering index is calculated according to the target characters that are in the text information and satisfy the predetermined rule, the problem in the prior art that junk text information cannot be filtered out because an illegal user adds a large number of target characters to the text information can be solved, thereby improving the accuracy and efficiency of filtering out junk text information.

In order to make the aforementioned and other objectives, features, and advantages of the present disclosure more comprehensible, preferred embodiments accompanied with drawings are described in detail below.

DESCRIPTION OF EMBODIMENTS

To further explain the technical means used in the present disclosure for achieving the intended objectives and the effects thereof, the specific implementation manners, structures, features, and effects of the present invention are described in detail below with reference to the accompanying drawings and preferred embodiments.

Figure 1:
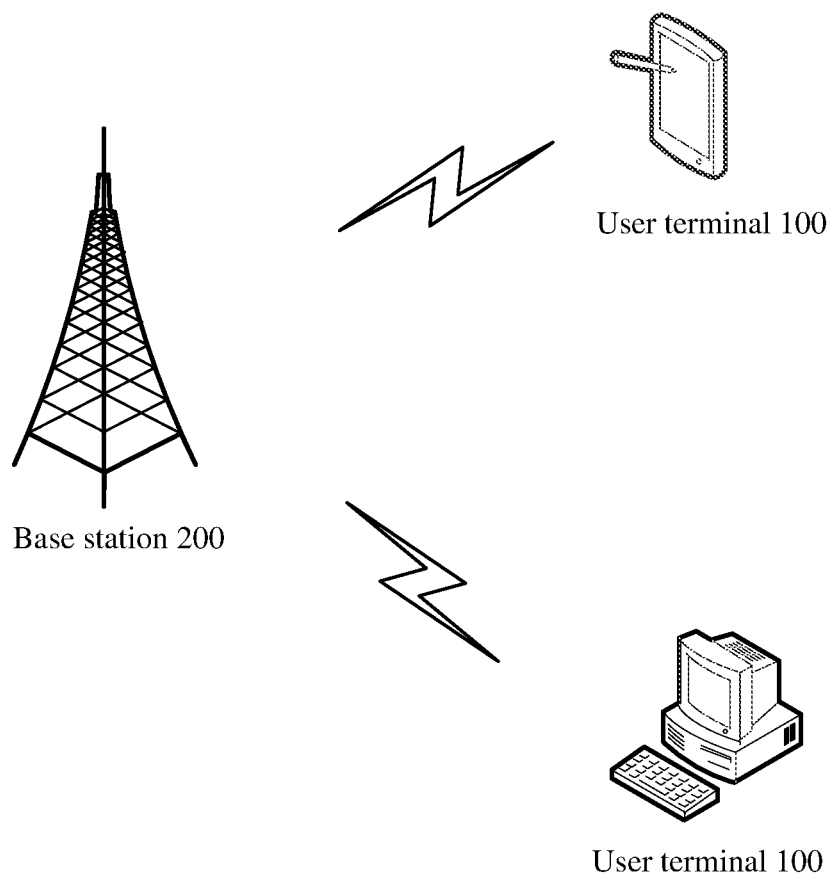
FIG. 1 is a diagram illustrating an application environment of a method and an apparatus for processing text information in a user terminal according to embodiments of the present invention.

The method and apparatus for processing text information provided in the embodiments of the present invention may be applied in the application environment shown in FIG. 1, so as to filter out junk text information efficiently. As shown in FIG. 1, multiple user terminals 100 may send and receive text information by forwarding SMS message service (SMS) messages through a base station 200. It should be understood that alternatively, the base station 200 may be a server, and the multiple user terminals 100 may send and receive text information through the server.

Figure 2:
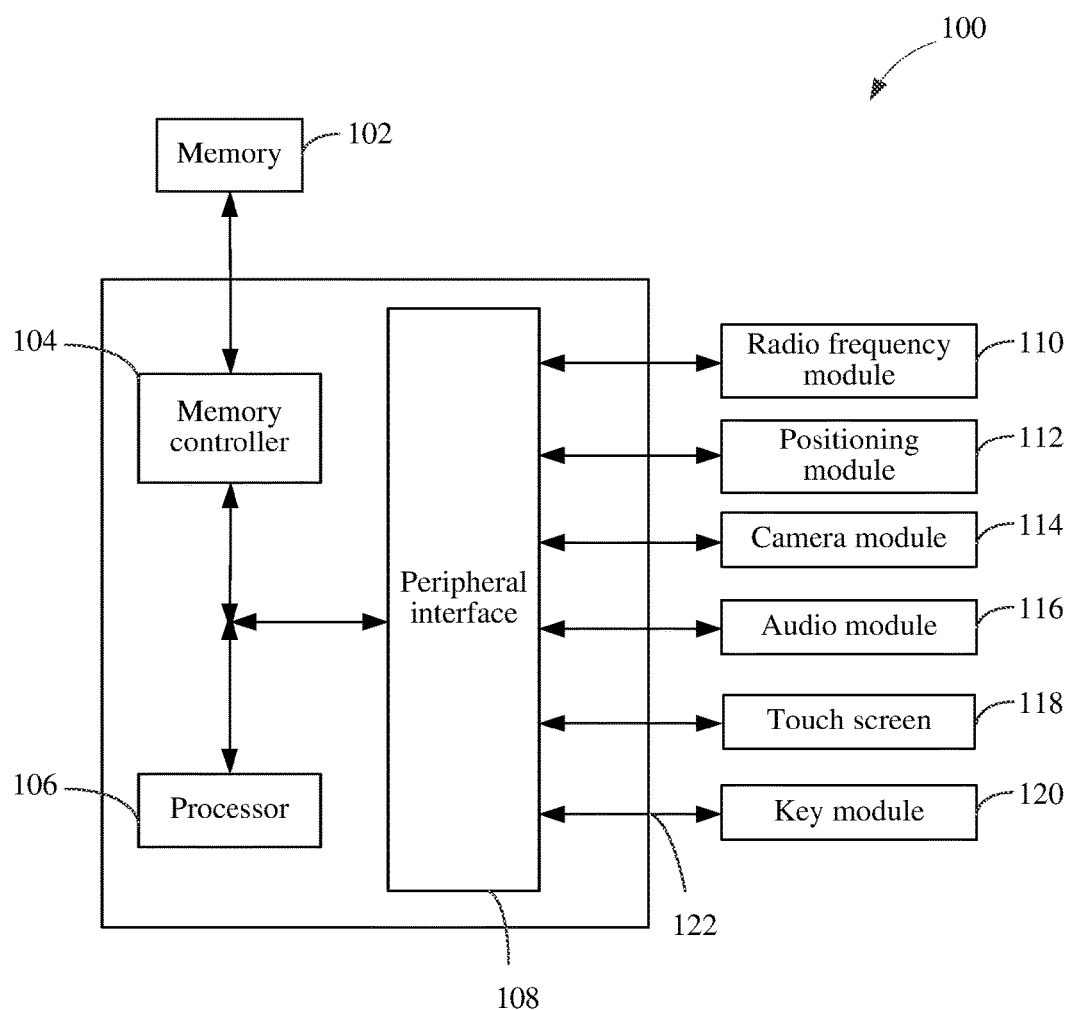
FIG. 2 is a structural block diagram of a user terminal.

FIG. 2 is a structural block diagram of a user terminal. The user terminal may be a mobile phone (for example, a smart phone) or any other computer having a user terminal function, for example, a portable, pocket-sized, handheld, built-in-computer, or vehicle-mounted mobile apparatus such as a tablet computer or a personal digital assistant (PDA), or a non-mobile apparatus such as a desktop computer.

As shown in FIG. 1, the user terminal 100 includes a memory 102, a memory controller 104, one or more processors 106 (only one processor 106 is shown), a peripheral interface 108, a radio frequency module 110, a positioning module 112, an image capturing device 114, an audio module 116, a touch screen 118, and a key module 120. These components communicate with each other through one or more communication buses/signal lines 122.

It may be understood that, FIG. 1 merely shows a schematic structure, and the user terminal 100 may also include more or fewer components than those shown in FIG. 1 or have a configuration different from that shown in FIG. 1. The components shown in FIG. 1 may be implemented by using hardware, software, or a combination thereof.

The memory 102 may be configured to store a software programs and modules, such as a program instruction/module corresponding to the method and an apparatus for processing text information in the user terminal in the embodiments of the present invention. The processor 106 runs the software program and module stored in the memory 102 to perform various functional applications and perform data processing, thereby implementing the aforementioned method for processing text information in the user terminal.

The memory 102 may include a high-speed random access memory, and may also include a non-volatile memory, for example, one or more magnetic storage devices, flash memories, or other non-volatile solid-state memories. In some embodiments, the memory 102 may further include memories remotely disposed relative to the processor 106, and these remote memories may be connected to the user terminal 100 through a network. Examples of the network include but are not limited to, the Internet, an intranet, a local area network, a mobile communications network, or a combination thereof. The processor 106 and other possible components may access the memory 102 under the control of the memory controller 104.

The peripheral interface 108 couples various input/output devices to the CPU and the memory 102. The processor 106 runs various software and instructions in the memory 102 to perform various functions of the user terminal 100 and perform data processing.

In some embodiments, the peripheral interface 108, the processor 106, and the memory controller 104 may be implemented in a single chip. In some other examples, they may be separately implemented by an independent chip.

The radio frequency module 110 is configured to receive and send an electromagnetic wave, and implement conversion between the electromagnetic wave and an electrical signal, so as to communicate with a communications network or another device. The radio frequency module 110 may include various existing circuit elements for performing these functions, such as an antenna, a radio frequency transceiver, a digital signal processor, a cipher/decipher chip, a subscriber identity module (SIM) card, and a memory. The radio frequency module 110 may communicate with various networks such as the Internet, an intranet, or a wireless network, or communicate with other devices through a wireless network. The wireless network may include a cellular telephone network, a wireless local area network, or a metropolitan area network. The wireless network may use various communication standards, protocols, and technologies, which include, but are not limited to, Global System for Mobile Communication (GSM), Enhanced Data GSM Environment (EDGE), Wideband Code Division Multiple Access (W-CDMA), Code Division Multiple Access (CDMA), Time Division Multiple Access (TDMA), Bluetooth, Wireless Fidelity (WiFi) (for example, US Institute of Electrical and Electronics Engineers IEEE 802.11a, IEEE 802.11b, IEEE 802.11g, and/or IEEE 802.11n), Voice over Internet Protocol (VoIP), Worldwide Interoperability for Microwave Access (Wi-Max), other protocols for email, instant messaging, and SMS, and any other suitable communication protocols, and even may include some protocols that have not been developed.

The positioning module 112 is configured to obtain a current location of the user terminal 100. The positioning module 112 includes, for example, but is not limited to, a global positioning system (GPS) or a positioning technology based on a wireless local area network or a mobile communications network.

The image capturing device 114 is configured to capture a picture or video. The captured picture or video may be stored in the memory 102, and may be sent by using the radio frequency module 110.

The audio module 116 provides an audio interface for a user, and may include one or more microphones, one or more loudspeakers, and an audio circuit. The audio circuit receives audio data from the peripheral interface 108, converts the audio data into electric information, and transmits the electrical information to the loudspeaker. The loudspeaker converts the electric information into an acoustic wave audible to the human ear. The audio circuit further receives electric information from the microphone, converts the electric signal into audio data, and transmits the acoustic data to the peripheral interface 108 for further processing. The audio data may be obtained from the memory 102 or by the radio frequency module 110. In addition, the audio data may also be stored in the memory 102 or sent by the radio frequency module 110. In some examples, the audio module 116 may further include an earphone jack, for providing an audio interface to an earphone or another device.

The touch screen 118 provides an output and input interface between the user terminal 100 and the user. Specifically, the touch screen 118 displays a video output to the user, and content of the video outputs may include texts, images, videos, or any combination thereof. Some output results correspond to some user interface objects. The touch screen 118 further receives an input of the user, such as tapping, sliding, or other gesture operations of the user, so that the user interface object responds to the input of the user. The technology for detecting the input of the user may be a resistive touch detection technology, a capacitive touch detection technology, or any other possible touch detection technologies. Specific examples of a display unit of the touch screen 118 include but are not limited to a liquid crystal display or a light-emitting polymer display.

The key module 120 also provides an interface for the user to input information to the user terminal 100. The user may press different keys to enable the user terminal 100 to perform different functions.

Figure 3:
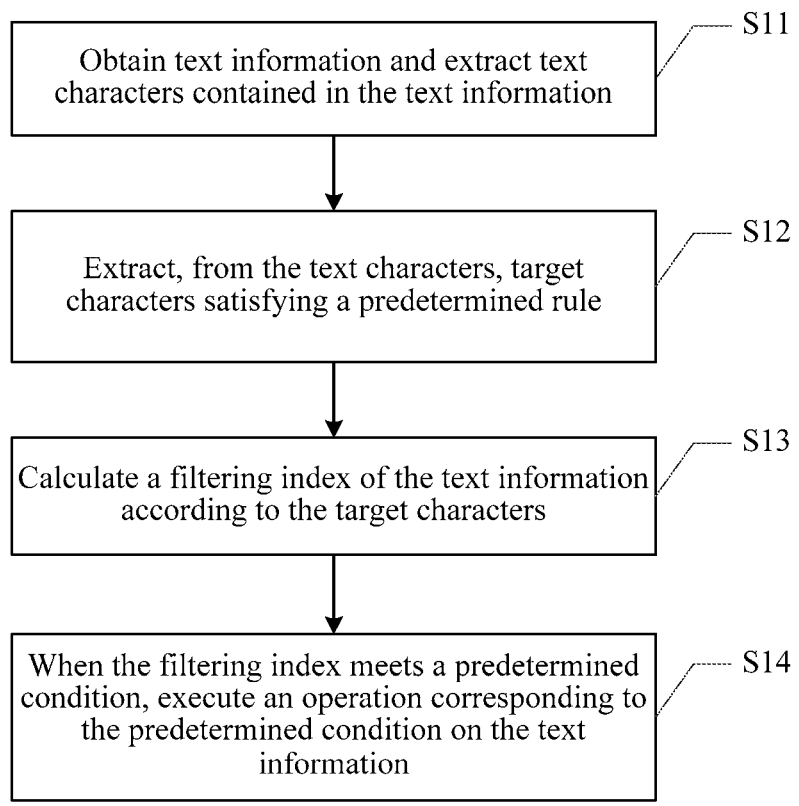
FIG. 3 is a flowchart of a method for processing text information in a user terminal according to a first embodiment of the present invention.

FIG. 3 is a flowchart of a method for processing text information in a user terminal according to the first embodiment of the present invention. As shown in FIG. 3, the method for processing text information in this embodiment includes the following steps:

Step S11: Obtain text information and extract text characters contained in the text information.

In a specific implementation manner of this embodiment, the text information may be obtained in the form of an SMS message by an SMS center, or obtained by using an instant messaging application program client, or obtained in the form of an email. In other specific implementation manners of this embodiment, the text information may also be text information published by a user on a network forum, zone, or blog. The text characters contained in the text information may include one or more of the following types: Chinese character, English alphabet, punctuation mark, digit, mathematical unit, tab, and text in other languages (for example, Russian alphabet) or other special symbols (for example, "↗").

Step S12: Extract, from the text characters, target characters satisfying a predetermined rule.

In a specific implementation manner of this embodiment, the user terminal may have a built-in interfering character dictionary table. The interfering character dictionary table records preset interfering information characters. The interfering information characters may include one or more of the following types: punctuation mark, mathematical unit, text in other languages (for example, Russian alphabets, and so on), tab, and other special symbols (for example, "↗"). Certainly, according to the actual situation, preset interfering information characters recorded in the interfering character dictionary table may also be different, and the specific implementation manner of the present disclosure is not limited thereto. The target characters satisfying the predetermined rule may include characters matching the preset interfering information characters recorded in the built-in interfering character dictionary table.

Specifically, the user terminal extracts text characters contained in the text information, matches the extracted text characters one by one with interfering information characters recorded in a preset interfering character dictionary table, obtains characters that are in the text characters and match the preset interfering information characters, and marks the characters as target characters.

Step S13: Calculate a filtering index of the text information according to the target characters.

In a specific implementation manner of this embodiment, the filtering index of the text information may be a proportion of the target characters to the text characters excluding the target characters. Please refer to relevant descriptions in the following embodiments for the specific calculation.

Step S14: When the filtering index meets a predetermined condition, execute an operation corresponding to the predetermined condition on the text information.

In a specific implementation manner of this embodiment, when the filtering index falls within a preset numerical range, it is determined that the text information is junk text information, and an operation corresponding to the predetermined condition is executed on the text information. The preset numerical range may be 8%-25%. The operation corresponding to the predetermined condition may be: intercepting or deleting the text information, or giving a prompt to the user according to a preset prompting manner. Certainly, it may also be set that when the filtering index is equal to a preset numerical value, for example, 14.7%, it is determined that the text information is junk text information, and an operation corresponding to the predetermined condition is executed on the text information.

Furthermore, hierarchical management may be performed on the text information according to the filtering index. For example, when the filtering index falls within a first numerical range, for example, the filtering index is greater than 8% and less than or equal to 10%, the text information is marked (for example, the color of the text is changed); when the filtering index falls within a second numerical range, for example, the filtering index is greater than 10% and less than or equal to 15%, a prompt about the text information is provided according to a preset prompting manner (for example, by adding a message tail); when the filtering index falls within a third numerical range, for example, the filtering index is greater than 15% and less than or equal to 20%, the text information may be moved to a preset folder, and the user is instructed to read the text information from the preset folder to check the text information; and when the filtering index falls within a fourth numerical range, for example, the filtering index is greater than 20% and less than or equal to 25%, the text information may be deleted directly.

In the method for processing text information provided in this embodiment of the present invention, text characters contained in text information are extracted, target characters satisfying a predetermined rule are extracted from the text characters, a filtering index of the text information is calculated according to the target characters, and when the filtering index meets a predetermined condition, an operation corresponding to the predetermined condition is executed on the text information. Because the filtering index is calculated according to the target characters that are in the text information and satisfy the predetermined rule, the problem in the prior art that junk text information cannot be filtered because an illegal user adds a large number of target characters to the text information can be solved, thereby improving the accuracy and efficiency of filtering out junk text information.

Figure 4:
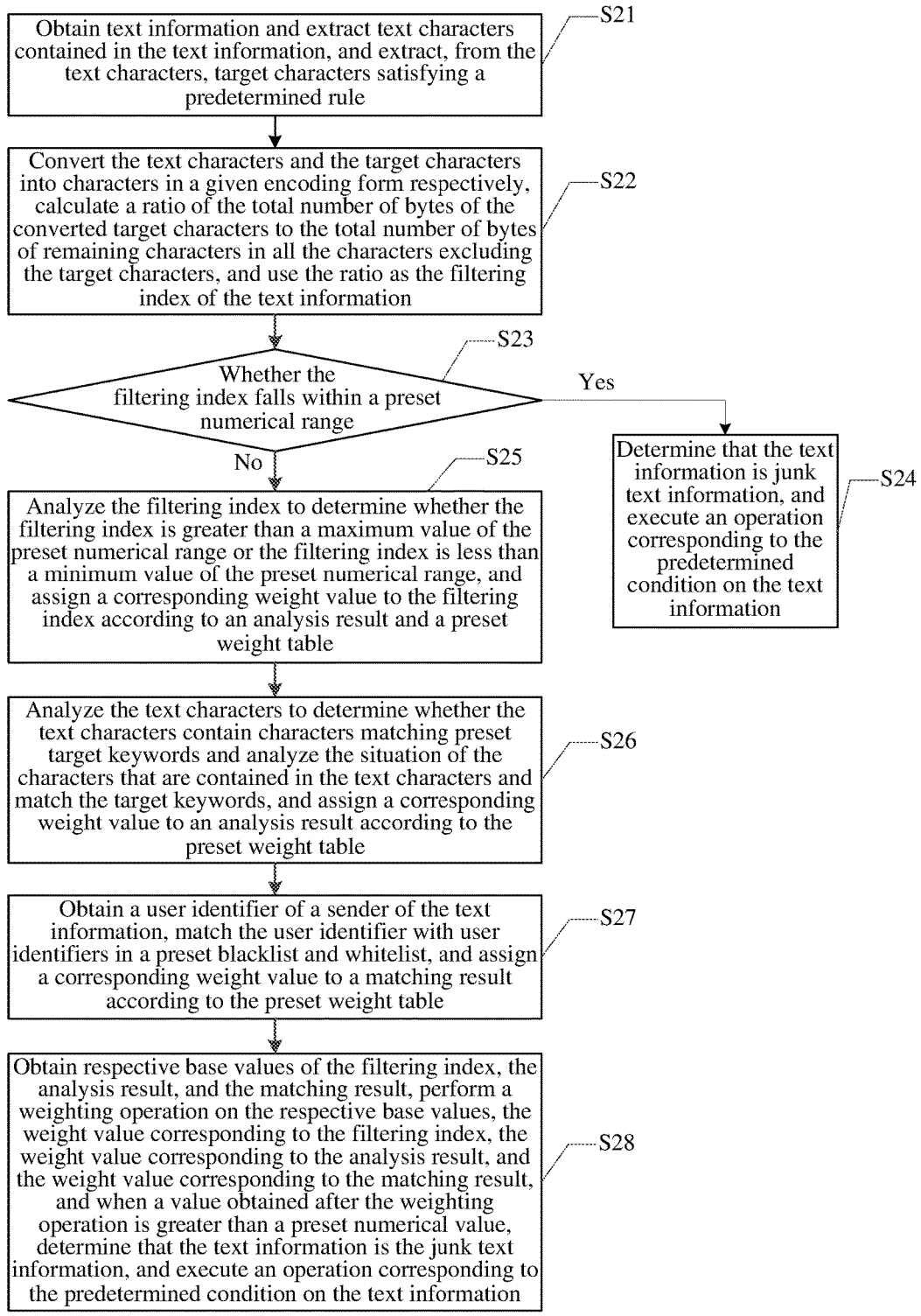
FIG. 4 is a flow chart of a method for processing text information in a user terminal according to a second embodiment of the present invention.

FIG. 4 is a flowchart of a method for processing text information in a user terminal according to the second embodiment of the present invention. As shown in FIG. 4, the method for processing text information according to this embodiment includes the following steps:

Step S21: Obtain text information and extract text characters contained in the text information, and extract, from the text characters, target characters satisfying a predetermined rule.

Reference may be made to the corresponding content of the above embodiment for the details of step S21, which will not be described herein again.

Step S22: Separately convert the text characters and the target characters into characters in a given encoding form, calculate a ratio of the total number of bytes of the converted target characters to the total number of bytes of remaining characters in the text characters excluding the target characters, and use the ratio as a filtering index of the text information.

Using an SMS message as an example, it is assumed that the text information is content of the SMS message. Usually, the user terminal sends and receives SMS messages in a protocol data unit (PDU) mode. The content of the text information in the PDU mode may use the following three encoding forms: 7-bit, 8-bit, and universal character set 2 (UCS2) encoding forms. The 7-bit encoding is used for sending common American Standard Code for Information Interchange (ASCII) characters, the 8-bit encoding is usually used for sending data messages, and the UCS2 encoding is used for sending Unicode characters. Unicode is a kind of computer character encoding, which is also referred to as "unified code" or "universal code". Unicode is invented to overcome the limitation of conventional character encoding schemes, and sets a unified and unique binary code for each character in each language, so as to meet the requirements for cross-language and cross-platform text conversion and processing.

In a specific implementation manner of this embodiment, the user terminal may convert the text characters and target characters contained in the text information and encoded in the 7-bit, 8-bit, and/or UCS2 encoding form into characters in an 8-bit Unicode transformation format (UTF-8) encoding form. UTF-8 is a kind of variable-length character encoding for Unicode. UTF-8 encodes Unicode in a unit of byte, and is characterized in that codes of different lengths are used for characters in different ranges.

In other specific implementation manners of this embodiment, the given encoding form may also be Chinese Internal Code Specification (GBK, a Chinese character encoding standard) encoding, American National Standards Institute (ANSI) encoding, or other encoding forms.

It should be understood that because UTF-8 is a kind of international encoding, preferably, the text characters and the target characters contained in the text information are separately converted into characters in the UTF-8 encoding form, so that information loss can be avoided, thereby improving the accuracy of the result of filtering out junk text information.

The user terminal 100 separately counts the total number B1 of bytes of the converted text characters contained in the text information and the total number B2 of bytes of the converted target characters, subtracts B1 from B2 to obtain the total number B3 of bytes of remaining characters (namely, useful information characters) in the text characters excluding the target characters, in which B3=(B1−B2), and performs calculation to obtain a ratio of B2 to B3: R=B2/B3 (namely, a signal-to-noise ratio R of the text information), that is, a proportion of the target characters (the interfering information characters), in the text information, to the useful information characters, and uses the proportion as the filtering index of the text information.

Step S23: Determine whether the filtering index falls within a preset numerical range.

If the filtering index falls within the preset numerical range, step S24 is performed: determine that the text information is junk text information, and execute an operation corresponding to the predetermined condition on the text information.

Specifically, if the filtering index R=B2/B3 falls within the preset numerical range, it is determined that the received text information is junk text information, and a corresponding operation is performed on the text information, for example, the text information is intercepted or deleted, or a prompt is given according to a preset prompting manner (for example, by adding a message tail). Specifically, the text information may be moved to a preset folder, and the user is instructed to read the text information from the preset folder to check the text information, or the text information is deleted directly. It should be understood that, the user terminal may further report a calling number and content information of the text information to a junk text information monitoring center after intercepting the text information, so that the user terminal and other user terminals monitor, by using the junk text information monitoring center, other text information from the calling number of the text information later. Alternatively, the user terminal may further mark the text information to remind the user that the text information is junk information.

Because the filtering index is calculated according to the target characters that are in the text information and satisfy the predetermined rule, the problem in the prior art that junk text information fails to be filtered because an illegal user adds a large number of target characters to the text information can be solved, thereby improving the accuracy and efficiency of filtering out junk text information.

In this embodiment, if the filtering index does not fall within the preset numerical range, step S25 is performed: analyze the filtering index to determine whether the filtering index is greater than a maximum value of the preset numerical range or the filtering index is less than a minimum value of the preset numerical range, and assign a corresponding weight value to the filtering index according to an analysis result and a preset weight table.

Step S26: Analyze the text characters to determine whether the text characters contain characters matching preset target keywords and analyze the situation of the characters that are contained in the text characters and match the target keywords, and assign a corresponding weight value to an analysis result according to the preset weight table.

Step S27: Obtain a user identifier of a sender of the text information, match the user identifier with user identifiers in a preset blacklist and whitelist, and assign a corresponding weight value to a matching result according to the preset weight table.

Specifically, if the filtering index R does not fall within the preset numerical range, the user terminal analyzes the filtering index R and the preset numerical range to obtain a filtering index analysis result. The filtering index analysis result may be: the filtering index R of the text information is greater than a maximum value of the preset numerical range, or the filtering index R of the text information is less than a minimum value of the preset numerical range.

In a specific implementation manner of this embodiment, a weight assignment table may be preset in the user terminal. As shown in table 1 below, the weight assignment table records obtained filtering index analysis results and corresponding weight values thereof.

TABLE 1

| Filtering index analysis result | Corresponding weight value (M) |
|---|---|
| The filtering index R is greater than a maximum value of the preset numerical range. | M1 |
| The filtering index R is less than a minimum value of the preset numerical range. | M2 |

| Target keyword analysis result | Corresponding weight value (K) |
|---|---|
| Contain target keywords, and the number of the contained target keywords is greater than or equal to a preset numerical value. | K1 |
| Contain target keywords are contained, and the number of the contained target keywords is less than a preset numerical value. | K2 |
| No target keyword contained | K3 |

TABLE 1-continued

| Blacklist and whitelist matching result | Corresponding weight value (L) |
| --- | --- |
| The calling number matches a number in the blacklist. | L1 |
| The calling number matches a number in the whitelist. | L2 |
| The calling number does not match any number in the blacklist and whitelist. | L3 |

The target keywords may include: words or terms related to commercial advertisements or fraud, for example, loan, invoice, or discount, and homophones thereof; terms related to harassing information and politics, for example, friend making, XX service, XX sect, or XX cult, and homophones thereof; or a digit string of a preset length, for example, a card number of an Agricultural Bank of China card consisting of 19 digits.

In a specific implementation manner of this embodiment, a blacklist and whitelist may be preset in the user terminal, and as shown in table 1, different weight values are separately preset for user identifiers in the blacklist and the whitelist. The user identifiers in the blacklist and whitelist may be managed according to editing operations performed by the user. The user identifiers may include a telephone number, a user accounts, and the like.

The user terminal queries table 1 according to the filtering index analysis result to obtain the corresponding weight value M.

The user terminal analyzes the text characters to determine whether the text characters contain characters matching the preset target keywords, if yes, the user terminal counts the number of the contained characters, and determines whether the number of the contained characters is greater than or equal to a preset numerical value, obtains a target keyword analysis result, and queries table 1 according to the target keyword analysis result to obtain the corresponding weight value K.

The user terminal obtains a user identifier of a sender of the text information, matches the user identifier with user identifiers in a preset blacklist and whitelist, and assigns a corresponding weight value L to a matching result according to table 1.

Step S28: Obtain respective base values of the filtering index, the analysis result, and the matching result, perform a weighting operation on the respective base values, the weight value corresponding to the filtering index, the weight value corresponding to the analysis result, and the weight value corresponding to the matching result, and when a value obtained after the weighting operation is greater than a preset numerical value, determine that the text information is the junk text information, and execute a corresponding operation on the text information.

The user terminal obtains a preset base value A1 of the filtering index R, a preset base value A2 of the target keyword analysis result, and a preset base value A3 of the matching result of the user identifier of the sender in the blacklist and whitelist, performs a weighting operation on the obtained base values A1, A2, and A3, the weight value M corresponding to the filtering index R, the weight value K corresponding to the target keyword analysis result, and the weight value L corresponding to the matching result, and if the value S ($S=A1*K+A2*M+A3*L$) obtained after the weighting operation is greater than a preset numerical value, determines that the received text information is junk text information, and executes a corresponding operation on the text information.

When the filtering index R of the text information does not fall within the preset numerical range, the content of the text information is analyzed and filtered from multiple dimensions by combining the filtering index R with the target keywords and the blacklist and whitelist, so that the accuracy of filtering out junk text information can be further improved, thereby improving the efficiency of filtering out junk text information.

In another specific implementation manner of this embodiment, a corresponding weight value M3 may also be set for the situation that the filtering index R falls within the preset numerical range. Even if the filtering index R falls within the preset numerical range, the received text information is determined as the junk text information and a corresponding operation is executed on the text information only when the value S obtained after the weighting operation is performed on the obtained base values A1, A2, and A3, the weight value M corresponding to the filtering index R, the weight value K corresponding to the target keyword analysis result, and the weight value L corresponding to the matching result is greater than the preset numerical value. That is, step S23 to step S25 are combined as follows: analyzing a magnitude relationship between the filtering index and the preset numerical range, and assigning a corresponding weight value to the filtering index according to an analysis result and a preset weight table.

In the method for processing text information provided in this embodiment of the present invention, text characters contained in text information are extracted, target characters satisfying a predetermined rule are extracted from the text characters, a filtering index of the text information is calculated according to the target characters, and when the filtering index meets a predetermined condition, an operation corresponding to the predetermined condition is executed on the text information. Because the filtering index is calculated according to the target characters that are in the text information and satisfy the predetermined rule, the problem in the prior art that junk text information cannot be filtered because an illegal user adds a large number of target characters to the text information can be solved, thereby improving the accuracy and efficiency of filtering out junk text information. In addition, when the filtering index does not fall within the preset numerical range, the content of the text information is filtered from multiple dimensions by combining the filtering index with target keywords and a blacklist and whitelist, so as to achieve effective filtering on junk text information not containing a large number of interfering information characters, thereby further improving the accuracy and efficiency of filtering out junk text information.

Figure 5:
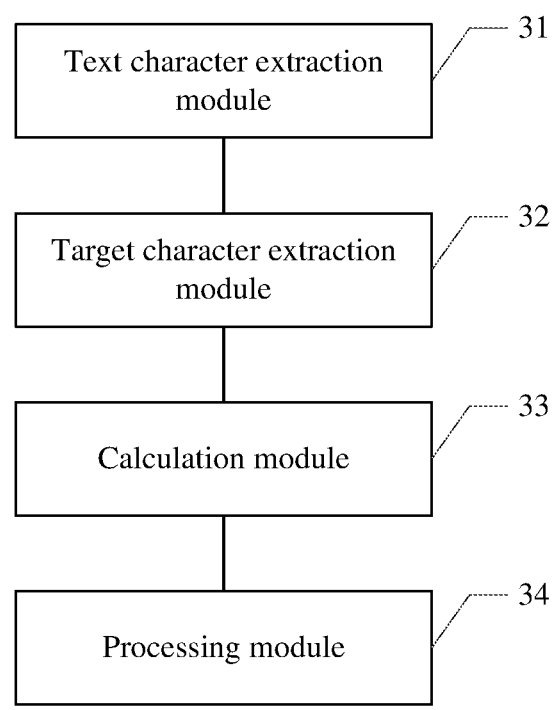
FIG. 5 is a schematic structural diagram of an apparatus for processing text information according to a third embodiment of the present invention.

FIG. 5 is a schematic structural diagram of an apparatus for processing text information in a user terminal according to the third embodiment of the present invention. The apparatus for processing text information provided in this embodiment may be applied to the methods for processing text information in the above embodiments. As shown in FIG. 5, the apparatus 30 for processing text information includes: a text character extraction module 31, a target character extraction module 32, a calculation module 33, and a processing module 34.

The text character extraction module 31 is configured to obtain text information and extract text characters contained in the text information.

The target character extraction module 32 is configured to extract, from the text characters extracted by the text character extraction module 31, target characters satisfying a predetermined rule.

The calculation module 33 is configured to calculate a filtering index of the text information according to the target characters extracted by the target character extraction module 32.

The processing module 34 is configured to: when the filtering index calculated by the calculation module 33 meets a predetermined condition, execute an operation corresponding to the predetermined condition on the text information.

Figure 6:
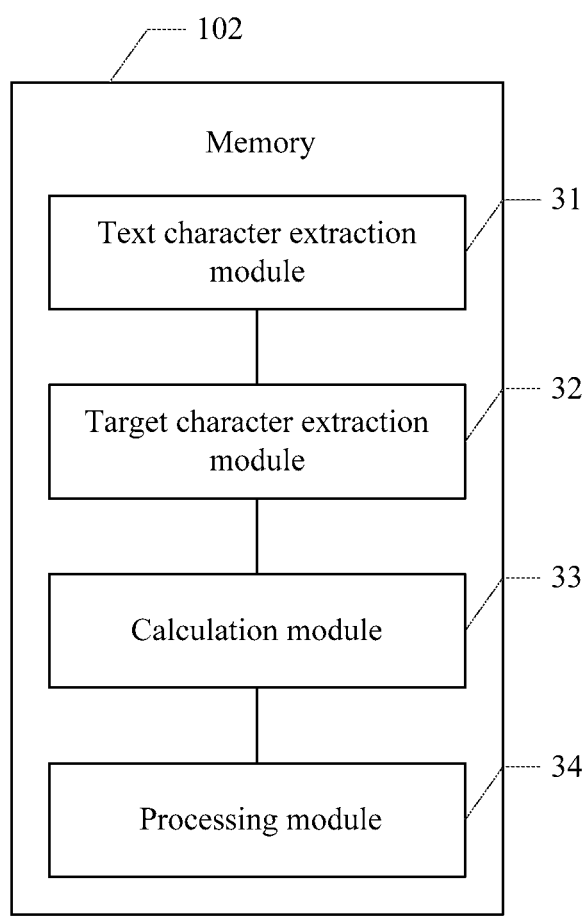
FIG. 6 is a schematic diagram illustrating a storage environment of the apparatus in FIG. 5.

The aforementioned modules may be implemented by software code. In this case, the aforementioned modules may be stored in the memory 102, as shown in FIG. 6. The aforementioned modules may also be implemented by hardware, for example, an integrated circuit chip.

Please refer to the specific content described in the embodiments shown in FIG. 1 to FIG. 4 for the specific process in which the functional modules of the apparatus 30 for processing text information implement their respective functions in this embodiment, which will not be described herein again.

In the apparatus for processing text information provided in this embodiment of the present invention, text characters contained in text information are extracted, target characters satisfying a predetermined rule are extracted from the text characters, a filtering index of the text information is calculated according to the target characters, and when the filtering index meets a predetermined condition, an operation corresponding to the predetermined condition is executed on the text information. Because the filtering index is calculated according to the target characters that are in the text information and satisfy the predetermined rule, the problem in the prior art that junk text information cannot be filtered because an illegal user adds a large number of target characters to the text information can be solved, thereby improving the accuracy and efficiency of filtering out junk text information.

Figure 7:
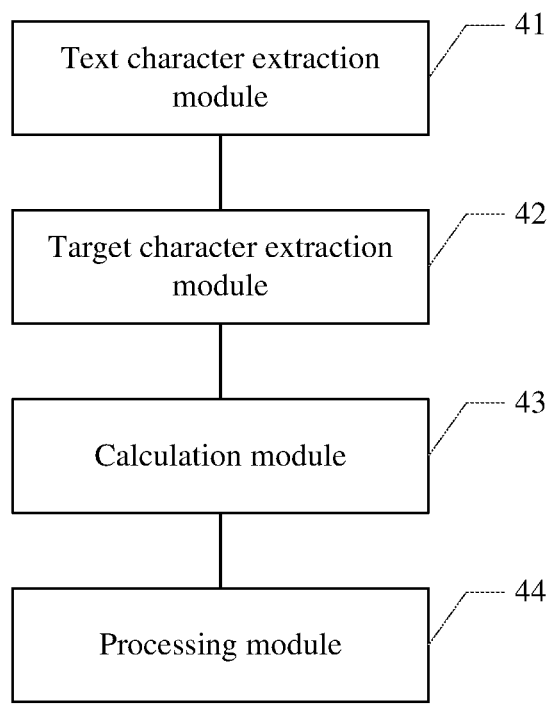
FIG. 7 is a schematic structural diagram of an apparatus for processing text information according to a fourth embodiment of the present invention.

FIG. 7 is a schematic structural diagram of an apparatus for processing text information in a user terminal according to the fourth embodiment of the present invention. The apparatus for processing text information provided in this embodiment may be applied to the methods for processing text information in the above embodiments. As shown in FIG. 7, the apparatus 40 for processing text information includes: a text character extraction module 41, a target character extraction module 42, a calculation module 43, and a processing module 44.

The text character extraction module 41 is configured to obtain text information and extract text characters contained in the text information.

The target character extraction module 42 is configured to extract, from the text characters extracted by the text character extraction module 41, target characters satisfying a predetermined rule.

The calculation module 43 is configured to calculate a filtering index of the text information according to the target characters extracted by the target character extraction module 42.

Specifically, the target character extraction module is configured to match the extracted text characters one by one with interfering information characters recorded in a preset interfering character dictionary table, and use characters that are in the text characters and match the interfering information characters as the target characters.

Figure 8:
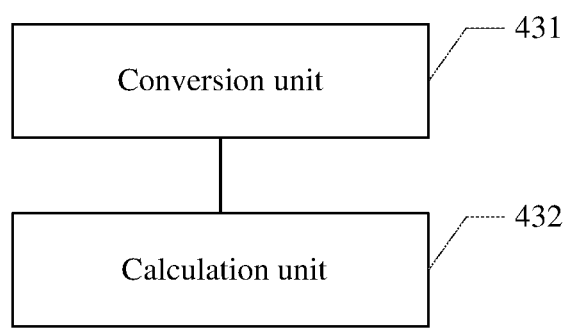
FIG. 8 is a schematic structural diagram of some modules in the apparatus for processing text information according to the fourth embodiment of the present invention.

As shown in FIG. 8, the calculation module 43 may include: a conversion unit 431 and a calculation unit 432. The conversion unit 431 is configured to separately convert the text characters and the target characters into characters in a given encoding form. The calculation unit 432 is configured to calculate a ratio of the total number of bytes of the converted target characters to the total number of bytes of remaining characters in the text characters excluding the target characters, and use the ratio as the filtering index of the text information The processing module 44 is configured to: when the filtering index calculated by the calculation module 43 meets a predetermined condition, execute an operation corresponding to the predetermined condition on the text information.

Figure 9:
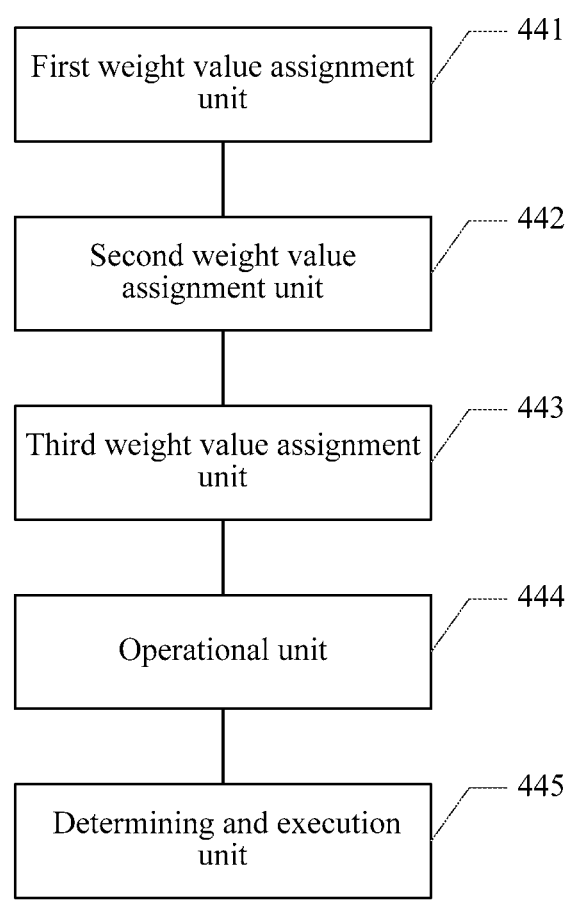
FIG. 9 is a schematic structural diagram of some modules in the apparatus for processing text information according to the fourth embodiment of the present invention.

As shown in FIG. 9, the processing module 44 may include: a first weight value assignment unit 441, a second weight value assignment unit 442, a third weight value assignment unit 443, an operational unit 444, and a determining and execution unit 445.

In a specific implementation manner of the present disclosure, the determining and execution unit 445 is configured to: when the filtering index falls within a preset numerical range, determine that the text information is junk text information, and execute an operation corresponding to the predetermined condition on the text information. The first weight value assignment unit 441 is configured to: when the filtering index does not fall within the preset numerical range, analyze the filtering index to determine whether the filtering index is greater than a maximum value of the preset numerical range or the filtering index is less than a minimum value of the preset numerical range, and assign a corresponding weight value to the filtering index according to an analysis result and a preset weight table. The second weight value assignment unit 442 is configured to analyze the text characters to determine whether the text characters contain characters matching preset target keywords and analyze the situation of the characters that are contained in the text characters and match the target keywords, and assign a corresponding weight value to an analysis result according to the preset weight table. The third weight value assignment unit 443 is configured to obtain a user identifier of a sender of the text information, match the user identifier with user identifiers in a preset blacklist and whitelist, and assign a corresponding weight value to a matching result according to the preset weight table. The operational unit 444 is configured to obtain respective base values of the filtering index, the analysis result, and the matching result, and perform a weighting operation on the respective base values, the weight value corresponding to the filtering index, the weight value corresponding to the analysis result, and the weight value corresponding to the matching result. The determining and execution unit 445 is configured to: when a value obtained after the weighting operation is greater than a preset numerical value, determine that the text information is the junk text information, and execute a corresponding operation on the text information.

In another specific implementation manner of the present disclosure, the first weight value assignment unit 441 is configured to analyze a magnitude relationship between the filtering index and the preset numerical range, and assign a corresponding weight value to the filtering index according to an analysis result and a preset weight table. The second weight value assignment unit 442 is configured to analyze the text characters to determine whether the text characters contain characters matching preset target keywords and analyze the situation of the characters that are contained in the text characters and match the target keywords, and assign a corresponding weight value to an analysis result according to the preset weight table. The third weight value assignment unit 443 is configured to obtain a user identifier of a sender of the text information, match the user identifier with user identifiers in a preset blacklist and whitelist, and assign a corresponding weight value to a matching result according to the preset weight table. The operational unit 444 is configured to obtain respective base values of the filtering index, the analysis result, and the matching result, and perform a weighting operation on the respective base values, the weight value corresponding to the filtering index, the weight value corresponding to the analysis result, and the weight value corresponding to the matching result. The determining and execution unit 445 is configured to: when a value obtained after the weighting operation is greater than a preset numerical value, determine that the text information is the junk text information, and execute a corresponding operation on the text information.

Preferably, the operation corresponding to the predetermined condition includes: intercepting or deleting the text information, or giving a prompt according to a preset prompting manner.

Preferably, the given encoding form is a UTF-8 encoding form.

Please refer to the specific content described in the embodiments shown in FIG. 1 to FIG. 4 for the specific process in which the functional modules of the apparatus 40 for processing text information implement their respective functions in this embodiment, which will not be described herein again.

In the apparatus for processing text information provided in this embodiment of the present invention, text characters contained in text information are extracted, target characters satisfying a predetermined rule are extracted from the text characters, a filtering index of the text information is calculated according to the target characters, and when the filtering index meets a predetermined condition, an operation corresponding to the predetermined condition is executed on the text information. Because the filtering index is calculated according to the target characters that are in the text information and satisfy the predetermined rule, the problem in the prior art that junk text information cannot be filtered because an illegal user adds a large number of target characters to the text information can be solved, thereby improving the accuracy and efficiency of filtering out junk text information. In addition, when the filtering index does not fall within the preset numerical range, the content of the text information is filtered from multiple dimensions by combining the filtering index with target keywords and a blacklist and whitelist, so as to achieve effective filtering on junk text information not containing a large number of interfering information characters, thereby further improving the accuracy and efficiency of filtering out junk text information.

It should be noted that the embodiments in this specification are all described in a progressive manner. Description of each of the embodiments focuses on differences from other embodiments, and reference could be made to each other for the same or similar part among respective embodiments. The apparatus embodiments are substantially similar to the method embodiments and therefore are only briefly described, and reference may be made to the method embodiments for the associated part.

It should be noted that in this text, the relational terms herein such as first or second are used only to differentiate an entity or operation from another entity or operation, and do not require or imply any actual relationship or sequence between these entities or operations. Moreover, terms like "include", "comprise", or any variants are intended to cover a non-exclusive inclusion. Therefore, in the context of a process, method, object or device that includes a series of elements, the process, method, object, or device not only includes such elements, but also includes other elements not specified expressly, or may further include inherent elements of the process, method, object or device. Unless otherwise specified, an element limited by "include a/an . . . " does not exclude other same elements existing in the process, the method, the article, or the device that includes the element.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The above descriptions are merely preferred embodiments of the present invention, and are not intended to limit the present disclosure in any form. Although the present disclosure has been disclosed above through the preferred embodiments, the embodiments are not intended to limit the present disclosure. A person skilled in the art can make some equivalent variations, alterations or modifications to the above-disclosed technical content without departing from the scope of the technical solutions of the present disclosure to obtain equivalent embodiments. Any simple alteration, equivalent change or modification made to the above embodiments according to the technical essence of the present disclosure without departing from the content of the technical solutions of the present disclosure shall fall within the scope of the technical solutions of the present disclosure.

What is claimed is:

1. A method for processing text information, comprising:
   obtaining, by a terminal, text information and extracting, by the terminal, text characters contained in the text information;
   extracting, by the terminal, from the text characters, target characters satisfying a predetermined rule;
   calculating, by the terminal, a filtering index of the text information according to the target characters;
   when the filtering index meets a predetermined condition, executing, by the terminal, an operation corresponding to the predetermined condition on the text information;
   wherein the step of calculating, by the terminal, the filtering index of the text information according to the target characters comprises: separately converting the text characters and the target characters into characters in a given encoding form; and calculating a ratio of a total number of bytes of the converted target characters to a total number of bytes of remaining characters in the converted text characters excluding the converted target characters, and using the ratio as the filtering index of the text information; and
   wherein, when the filtering index meets the predetermined condition, executing, by the terminal, the operation corresponding to the predetermined condition on the text information comprises:
      analyzing a magnitude relationship between the filtering index and a preset numerical range, and assigning a corresponding weight value to the filtering index according to an analysis result and a preset weight table, and
      when a value obtained after assigning the corresponding weight value to the filtering index according to the analysis result and the preset weight table meets the predetermined condition, executing, by the terminal, the operation corresponding to the predetermined condition on the text information comprises.

2. The method according to claim 1, wherein the step of extracting, by the terminal, from the text characters, target characters satisfying a predetermined rule comprises:

matching the extracted text characters one by one with interfering information characters recorded in a preset interfering character dictionary table, and using characters that are in the text characters and match the interfering information characters as the target characters.

3. The method according to claim 1, wherein the step of, when the filtering index meets a predetermined condition, executing, by the terminal, an operation corresponding to the predetermined condition on the text information further comprises:

when the filtering index falls within a preset numerical range, determining that the text information is junk text information, and executing an operation corresponding to the predetermined condition on the text information.

4. The method according to claim 3, wherein the method further comprises:

when the filtering index does not fall within the preset numerical range, analyzing, by the terminal, the filtering index to determine whether the filtering index is greater than a maximum value of the preset numerical range or the filtering index is less than a minimum value of the preset numerical range, and assigning, by the terminal, a corresponding weight value to the filtering index according to an analysis result and the preset weight table;

analyzing, by the terminal, the text characters to determine whether the text characters contain characters matching preset target keywords and analyzing, by the terminal, the situation of the characters that are contained in the text characters and match the target keywords, and assigning, by the terminal, a corresponding weight value to an analysis result according to the preset weight table;

obtaining, by the terminal, a user identifier of a sender of the text information, matching, by the terminal, the user identifier with user identifiers in a preset blacklist and whitelist, and assigning, by the terminal, a corresponding weight value to a matching result according to the preset weight table;

obtaining, by the terminal, respective base values of the filtering index, the analysis result, and the matching result, and performing, by the terminal, a weighting operation on the respective base values, the weight value corresponding to the filtering index, the weight value corresponding to the analysis result, and the weight value corresponding to the matching result; and when a value obtained after the weighting operation is greater than a preset numerical value, determining, by the terminal, that the text information is the junk text information, and executing, by the terminal, the corresponding operation on the text information.

5. A method for processing text information, the method comprising:

obtaining, by a terminal, text information and extracting, by the terminal, text characters contained in the text information;

extracting, by the terminal, from the text characters, target characters satisfying a predetermined rule;

calculating, by the terminal, a filtering index of the text information according to the target characters;

when the filtering index meets a predetermined condition, executing, by the terminal, an operation corresponding to the predetermined condition on the text information;

wherein the calculating, by the terminal, the filtering index of the text information according to the target characters comprises: separately converting the text characters and the target characters into characters in a given encoding form; and calculating a ratio of a total number of bytes of the converted target characters to a total number of bytes of remaining characters in the converted text characters excluding the converted target characters, and using the ratio as the filtering index of the text information; and wherein, when the filtering index meets a predetermined condition, the executing, by the terminal, the operation corresponding to the predetermined condition on the text information comprises:

analyzing a magnitude relationship between the filtering index and a preset numerical range, and assigning a corresponding weight value to the filtering index according to an analysis result and a preset weight table;

analyzing the text characters to determine whether the text characters contain characters matching preset target keywords and analyzing the situation of the characters that are contained in the text characters and match the target keywords, and assigning a corresponding weight value to an analysis result according to the preset weight table;

obtaining a user identifier of a sender of the text information, matching the user identifier with user identifiers in a preset blacklist and whitelist, and assigning a corresponding weight value to a matching result according to the preset weight table; and obtaining respective base values of the filtering index, the analysis result, and the matching result, and performing a weighting operation on the respective base values, the weight value corresponding to the filtering index, the weight value corresponding to the analysis result, and the weight value corresponding to the matching result; and when a value obtained after the weighting operation is greater than a preset numerical value, determining that the text information is the junk text information, and executing the corresponding operation on the text information.

6. The method according to claim 1, wherein the operation corresponding to the predetermined condition comprises: intercepting or deleting the text information, or giving a prompt in a preset prompting manner.

7. The method according to claim 1, wherein the given encoding form is an 8-bit Unicode transformation format (UTF-8) encoding form.

8. An apparatus for processing text information, comprising:

a memory storing instructions; and a processor in communication with the memory, wherein, when the processor executes the instructions, the processor is configured to cause the apparatus to:

obtain text information and extract text characters contained in the text information;

extract, from the text characters, target characters satisfying a predetermined rule;

calculate a filtering index of the text information according to the target characters;

when the calculated filtering index meets a predetermined condition, execute an operation corresponding to the predetermined condition on the text information;

wherein, when the processor is configured to cause the apparatus to calculate the filtering index of the text information according to the target characters, the processor is configured to cause the apparatus to separately convert the text characters and the target characters into characters in a given encoding form; and calculate a ratio of a total number of bytes of the converted target characters to a total number of bytes of remaining characters in the converted text characters excluding the converted target characters, and use the ratio as the filtering index of the text information; and wherein, when the processor is configured to cause the apparatus to execute the operation corresponding to the predetermined condition on the text information, the processor is configured to cause the apparatus to:

analyze a magnitude relationship between the filtering index and a preset numerical range, and assign a corresponding weight value to the filtering index according to an analysis result and a preset weight table, and when a value obtained after assigning the corresponding weight value to the filtering index according to the analysis result and the preset weight table meets the predetermined condition, execute the operation corresponding to the predetermined condition on the text information comprises.

9. The apparatus according to claim 8, wherein, when the processor is configured to cause the apparatus to extract, from the text characters, target characters satisfying a predetermined rule, the processor is configured to cause the apparatus to match the extracted text characters one by one with interfering information characters recorded in a preset interfering character dictionary table, and use characters that are in the text characters and match the interfering information characters as the target characters.

10. The apparatus according to claim 8, wherein, when the processor is configured to cause the apparatus to execute the operation corresponding to the predetermined condition on the text information, the processor is configured to further cause the apparatus to:

when the filtering index falls within a preset numerical range, determine that the text information is junk text information, and execute an operation corresponding to the predetermined condition on the text information.

11. The apparatus according to claim 8, wherein, when the processor executes the instructions, the processor is configured to further cause the apparatus to:

analyze a magnitude relationship between the filtering index and the preset numerical range, and assign a corresponding weight value to the filtering index according to an analysis result and a preset weight table;

analyze the text characters to determine whether the text characters contain characters matching preset target keywords and analyze the situation of the characters that are contained in the text characters and match the target keywords, and assign a corresponding weight value to an analysis result according to the preset weight table;

obtain a user identifier of a sender of the text information, match the user identifier with user identifiers in a preset blacklist and whitelist, and assign a corresponding weight value to a matching result according to the preset weight table;

obtain respective base values of the filtering index, the analysis result, and the matching result, and perform a weighting operation on the respective base values, the weight value corresponding to the filtering index, the weight value corresponding to the analysis result, and the weight value corresponding to the matching result; and when a value obtained after the weighting operation is greater than a preset numerical value, determine that the text information is the junk text information, and execute the corresponding operation on the text information.

12. The apparatus according to claim 10, wherein, when the processor executes the instructions, the processor is configured to further cause the apparatus to:

when the filtering index does not fall within a preset numerical range, analyze the filtering index to determine whether the filtering index is greater than a maximum value of the preset numerical range or the filtering index is less than a minimum value of the preset numerical range, and assign a corresponding weight value to the filtering index according to an analysis result and a preset weight table;

analyze the text characters to determine whether the text characters contain characters matching preset target keywords and analyze the situation of the characters that are contained in the text characters and match the target keywords, and assign a corresponding weight value to an analysis result according to the preset weight table;

obtain a user identifier of a sender of the text information, match the user identifier with user identifiers in a preset blacklist and whitelist, and assign a corresponding weight value to a matching result according to the preset weight table;

obtain respective base values of the filtering index, the analysis result, and the matching result, and perform a weighting operation on the respective base values, the weight value corresponding to the filtering index, the weight value corresponding to the analysis result, and the weight value corresponding to the matching result; and when a value obtained after the weighting operation is greater than a preset numerical value, determine that the text information is the junk text information, and execute the corresponding operation on the text information.

13. The apparatus according to claim 8, wherein the operation corresponding to the predetermined condition comprises: intercepting or deleting the text information, or giving a prompt in a preset prompting manner.

14. The apparatus according to claim 8, wherein the given encoding form is an 8-bit Unicode transformation format (UTF-8) encoding form.

* * * * *